United States Patent [19]
Takahashi

[11] Patent Number: 5,557,483
[45] Date of Patent: Sep. 17, 1996

[54] TAPE END DETECTION DEVICE

[75] Inventor: Kazuhiro Takahashi, Tokyo, Japan

[73] Assignee: Canon Kabushiki Kaisha, Tokyo, Japan

[21] Appl. No.: 794,052

[22] Filed: Nov. 19, 1991

[30] Foreign Application Priority Data

Nov. 22, 1990 [JP] Japan .................. 2-315964

[51] Int. Cl.$^6$ ................................. G11B 15/48
[52] U.S. Cl. .................. 360/74.6; 242/332.2; 242/333
[58] Field of Search .................... 360/74.1–74.2, 360/74.4–74.7, 69, 137; 242/195, 188, 57, 324, 332.2, 332.1, 333, 534.1; 369/58

[56] References Cited

U.S. PATENT DOCUMENTS

| | | | |
|---|---|---|---|
| 4,331,307 | 5/1982 | Furuta | 360/74.2 |
| 4,367,500 | 1/1983 | Furuta et al. | 360/74.2 |
| 4,528,604 | 7/1985 | Koyama | 360/74.6 |
| 4,570,876 | 2/1986 | Andoh et al. | 360/74.6 |
| 4,636,878 | 1/1987 | Murayama | 360/74.6 X |
| 4,905,106 | 2/1990 | Suzuki . | |
| 5,222,003 | 6/1993 | Miller et al. | 360/74.6 |

FOREIGN PATENT DOCUMENTS

| | | | |
|---|---|---|---|
| 58-41459 | 3/1983 | Japan | 360/74.6 |
| 59-121640 | 7/1984 | Japan | 360/74.6 |
| 60-254438 | 12/1985 | Japan | 360/74.6 |

Primary Examiner—Andrew L. Sniezek
Attorney, Agent, or Firm—Fitzpatrick, Cella, Harper & Scinto

[57] ABSTRACT

The detection period of detection unit for detecting a prescribed portion which is provided at at least an end of a tape is decreased in response to the detection of the prescribed portion by the detection unit so that the tape ends can be accurately detected on the basis of results of several detections, and the detection time can be reduced.

13 Claims, 3 Drawing Sheets

TAPE END DETECTION DEVICE

BACKGROUND OF THE INVENTION

1. Field of the Invention

The present invention relates to a tape end detection device for detecting the leading and trailing ends of a tape suitable for a recording or reproducing apparatus which uses, for example, a magnetic tape.

2. Description of the Related Art

A transparent portion or conductive portion is generally provided at either end of a tape so that tape movement is stopped when the transparent portion is detected.

However, when a tape is stopped on the basis of the results of a single detection of its leading or trailing end of the tape, there is the danger of producing error due to some disturbance. In addition, when the detection of the leading or trailing end is performed at least twice in order to prevent such error, much time is required until the results of the second and subsequent detections are obtained for confirming that the results of the respective detections agree and then deciding that the detected portion is the leading or trailing end. Since the tape is moving continuously during this time, there is the problem that after the first detection of the leading or trailing end, the leader or trailer of the tape still moves until the tape feed is stopped. Further, if much time is taken for detecting the ends, the tape is driven after the tape movement is stopped and damage to the apparatus could result. It is therefore not possible to detect the leading or trailing end many times.

SUMMARY OF THE INVENTION

It is an object of the present invention to provide a tape end detection device which has none of the above problems.

It is another object of the present invention to provide a tape end detection device which produces no error in the detection of the ends of a tape and no danger of damaging the tape or the apparatus used.

The invention is directed to a tape end detection device in which a portion is provided at at least an end of a tape for detection by a detector and a switching arrangement switches the detection period of the detector.

The features and the other objects of the present invention are made clear by the detailed description of preferred embodiments of the invention with reference to the drawings.

DETAILED DESCRIPTION OF PREFERRED EMBODIMENTS

An embodiment in which the present invention is applied to a VTR is described in detail below.

Figure 1:
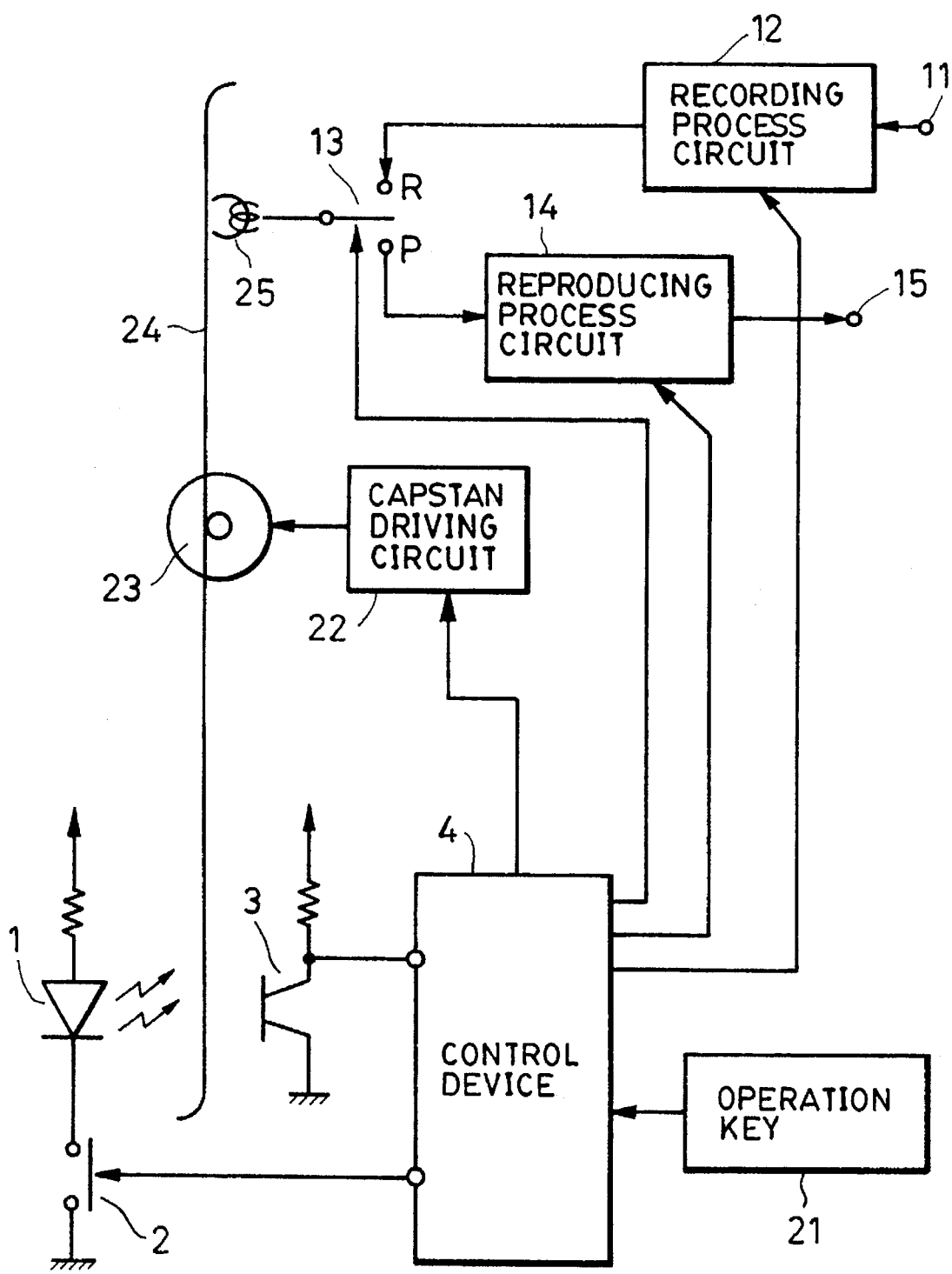
FIG. 1 is a schematic block diagram showing the configuration of a VTR in an embodiment of the present invention.

FIG. 1 is a schematic block diagram of the configuration of VTR in an embodiment of the present invention. In the drawing, reference numeral 11 denotes an input terminal for a video signal, and reference numeral 12 denotes a recording signal process circuit for processing the video signal input so that the signal has a form suitable for magnetic recording.

When a recording command is generated by the operation of an operation key 21, a control device 4 connects a switch 13 to the R-side and actuates the recording signal process circuit 12. At the same time, the control device 4 drives a capstan driving circuit 22 so that a capstan 23 is rotated at a predetermined rotational speed. This operation causes the capstan 23 to move a magnetic tape 24 in cooperation with a pinch roller (not shown), whereby the video signal output from the recording signal process circuit 12 is recorded on the magnetic tape 24 by a rotating magnetic head 25.

On the other hand, when a reproducing command is generated by the operation key 21, the control device 4 connects the switch 13 to the P-side and actuates a reproducing signal process circuit 14. At this time, the tape 24 is moved by the capstan 23 at a speed specified by the operation key 21. This operation causes the video signal reproduced by the head 25 to be supplied to the reproducing signal process circuit 14 through the P-side of the switch 13. The video signal is then converted into the original signal form by the circuit 14 and is output from an output terminal 15.

The operation key is capable of designating the rapid feed and rewinding of the tape other than the above recording and reproducing. The control device 4 controls the capstan driving circuit 22 in each of the modes so as to control the rotational speed of the capstan 23.

The control device 4 also operates the circuit for detecting the leading or trailing end of the tape 24 as described below when the tape 24 is moved by the capstan 23.

Namely, during the feed of the tape 24, a switch 2 is turned on and off by the signal output from the control device 4 comprising a microcomputer or the like so that a light emitting diode 1 is turned on and off. Reference numeral 3 denotes a light-receiving transistor for receiving the light emitted from the light emitting diode 1. The tape 24 is moved between the diode 1 and the transistor 3.

Both leader and trailer of the tape are transparent so as to transmit light, while the portion of the tape other than the leading and trailing ends thereof intercepts the signal output from the light emitting diode 1 so that the signal is not input to the light-receiving transistor 3 to alert the control device 4. On the other hand, at the leading and trailing ends of the tape 24, the signal output from the light emitting diode 1 is input to the light receiving transistor 3 and then the control device 4. This permits the control device 4 to decide whether or not the detected portion of the tape is the leading or trailing end thereof.

Figure 2:
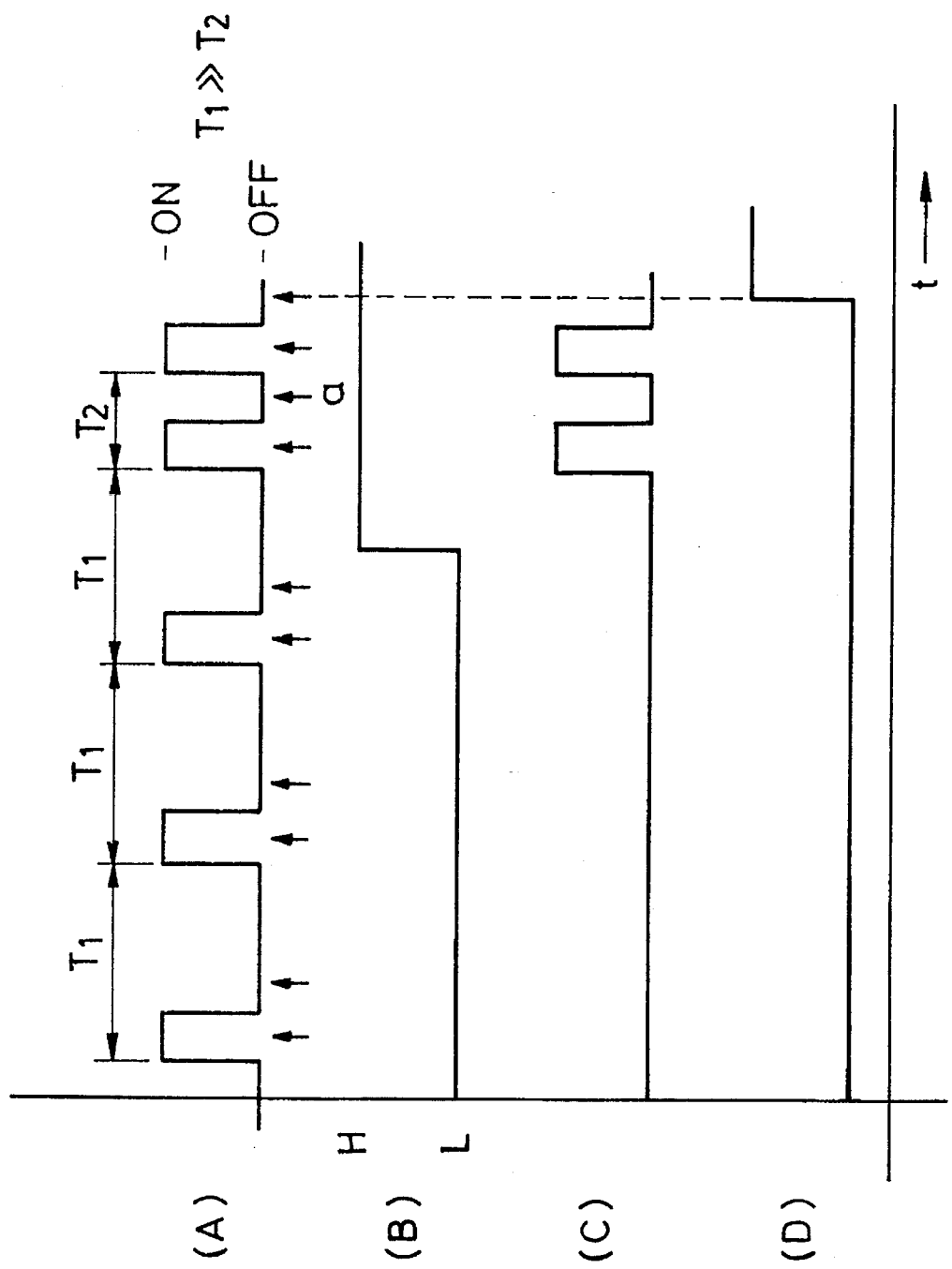
FIG. 2 is a timing chart explaining the operation of detecting the ends of a tape in the VTR shown in FIG. 1.

Waveform (A) in FIG. 2 shows the signal output from the control device 4 to the switch 2 in which the light emitting diode 1 is turned on and off with a period $T_1$ in the portion other than the leading and trailing ends of the tape, to produce a first light emission time interval while the light emitting diode 1 is turned on and off with a period $T_2$ after the decision on the leading or trailing end of the tape to produce a different finite duration light emmission interval. In waveform (A), each of the arrows shows the timing of decision on the output from the transistor 3 made by the control device 4. The first decision on the leading or trailing end is made at point a. Waveform (B) shows the time the leader or trailer of the tape is present between the light emitting diode 1 and the light receiving transistor 3. In waveform (B), the levels "L" and "H" show the times the portion other than the leader and trailer, and the leader or trailer are respectively present between the light emitting diode 1 and the light receiving transistor 3. Waveform (C) shows the signal input to the light receiving transistor 3. Waveform (D) shows the timing of the operation of stopping tape feed which is performed by the control device 4 after two detections of the leading or trailing end of the tape.

In waveform (A) of FIG. 2, $T_1 \gg T_2$ so that light is emitted from the light emitting diode 1 with the long period $T_1$ in the portion other then the leading and trailing ends of the tape. It is thus possible to decrease the current consumption and the processing in k the control device 4. It is also possible to rapidly perform the second decision on the leading or trailing end with the different finite duration light emission interval of the period $T_2$ after the first decision on the leading or trailing end of the tape.

Figure 3:
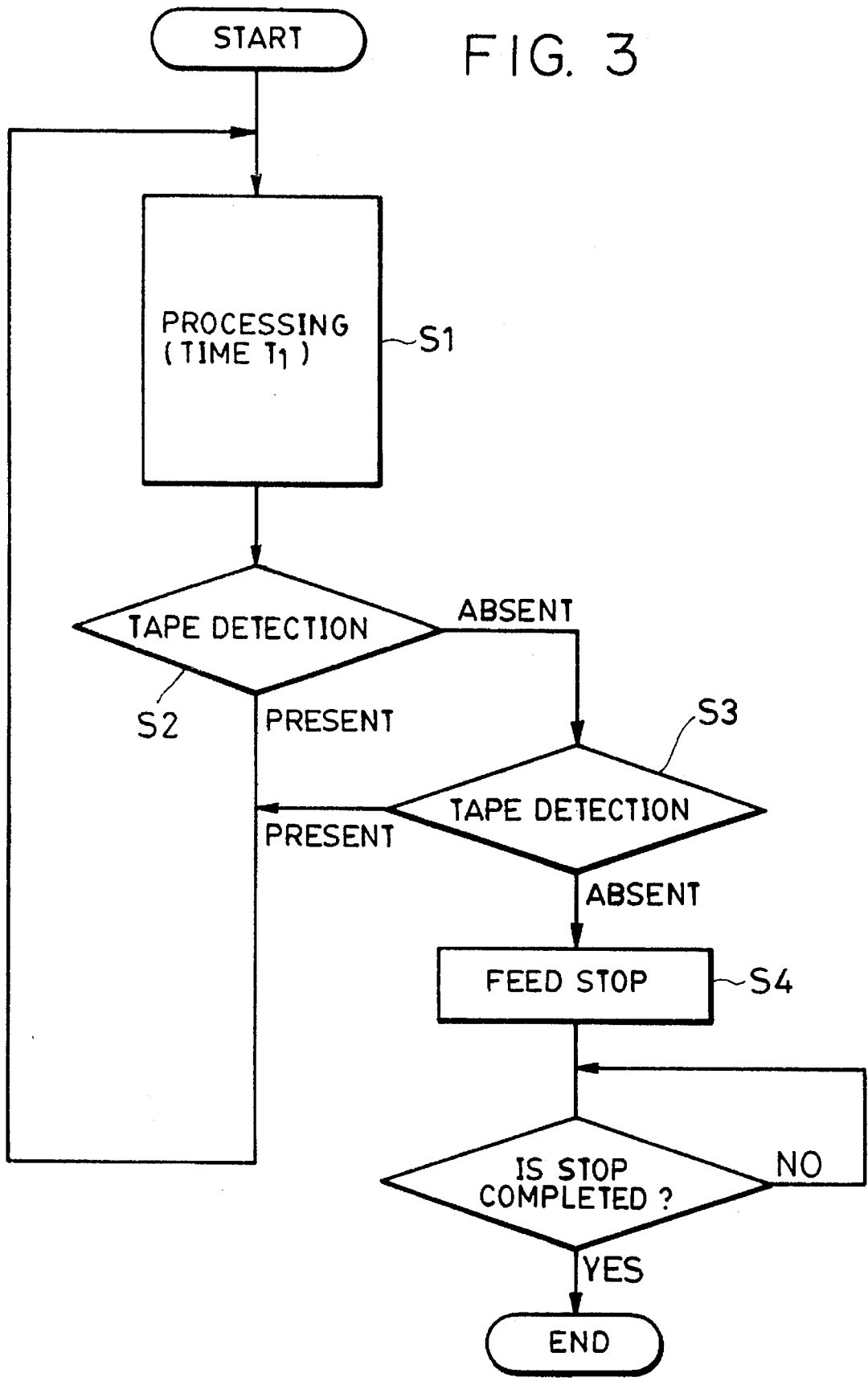
FIG. 3 is a flow chart explaining the operation of the control device shown in FIG. 1.

FIG. 3 shows a flow chart of the operation of the control device 4. In the drawing, the flow (S1, S2) having the processing time $T_1$ without tape detection applies to the portion other than the leading and trailing ends of the tape, and the flow is switched to the flow (S3) for again detecting and deciding that the detected portion is the leading or trailing end of the tape immediately after the first decision on the leading or trailing end of the tape in Step S2. In FIG. 3, after two decisions on the leading or trailing end of the tape (S2, S3), the flow moves to the feed stop operation (S4).

Although, in the above embodiment, the tape feed is stopped after the leading or trailing end of the tape has been detected twice, the operation of detecting the leading or trailing end of the tape with the short period $T_2$ can be repeated twice or more in the same way as that described above so that it is possible to prevent the occurrence of error in decision and effectively detect the leading or trailing end of the tape within a short time.

As described above, the present invention enables the rapid stopping of tape feed at the leading and trailing ends of the tape and rapid detection of the leading and trailing ends of the tape, thereby decreasing the stopping distance of the tape. Since the present invention also permits two or more detections of the leading and trailing ends, the invention has the effect of preventing the occurrence of an error in the decision on the leading and trailing ends.

The invention has been described with respect to a particular preferred embodiment thereof. It is to be understood, however, that various changes and modifications may be made by those skilled in the art without departing from the spirit and scope of the invention.

What is claimed is:

1. A tape end detection device, comprising:
   (a) detection means comprising light emitting means and light receiving means which detect a prescribed portion provided at, least one end of a tape in a preset detecting interval, said light receiving means being opposite to said light emitting means with said tape therebetween; and
   (b) switching means for switching an emission interval of said light emitting means to a different finite duration emission interval in response to a detection of said prescribed portion by the detection means.

2. A device according to claim 1, wherein said switching means operates to decrease the emission interval in response to termination of the detection interval in which said prescribed portion is detected by said detection means.

3. A device according to claim 1, further comprising transporting means for transporting said tape, and transport control means for stopping the transporting of said tape by said transporting means in correspondence with an output from said detection means.

4. A device according to claim 1, further comprising feed means for feeding said tape, and wherein said detection means is operated only when said tape is fed by said feed means.

5. A device according to claim 1, wherein said prescribed portion of said tape is transparent and the portion other than said prescribed portion is opaque.

6. A device according to claim 5, wherein said detection means detects one or more outputs from said light receiving means during at least a portion of the emission of said light emitting means.

7. A device according to claim 6, wherein said detection means detects the output from said light receiving means during at least a portion of the emission and non-emission of said light emitting means to detect said prescribed portion.

8. A tape end detection device, comprising:
   (a) light emitting means for periodically emitting light;
   (b) light receiving means provided opposite to said light emitting means through a tape having transparent portions at both ends thereof;
   (c) detection means for receiving an output from the light receiving means to detect said transparent portions; and
   (d) switching means for switching a light emission time interval of said light emitting means to a different finite duration light emission time interval in response to the detection of said transparent portions by said detection means.

9. A device according to claim 8, wherein said detection means detects the output from said light receiving means during at least a portion of the emission and non-emission of said light emitting means so as to detect said transparent portions.

10. A device according to claim 8, wherein said switching means decreases said light emission interval in response to the detection of each of said transparent portions by said detection means.

11. A device according to claim 8, further comprising feed means for feeding said tape, and feed control means for stopping the feed of said tape by said feed means in correspondence with the outputs from said detection means.

12. A method for detecting a tape end, comprising the steps of:
   (a) emitting radiation in a preset emission interval;
   (b) detecting a prescribed portion at at least an end of a tape in a preset detecting time interval; and
   (c) switching the emission interval to a different finite duration emission interval in response to termination of the detecting time interval in which said prescribed portion is detected.

13. An apparatus for recording or reproducing data on or from a tape, comprising:
   (a) detection means having light emitting means and light receiving means which detect a prescribed portion provided at at least one end of the tape in a preset detecting interval, said light receiving means being opposite to said light emitting means with said tape therebetween; and
   (b) switching means for switching an emission interval of said light emitting means to a different finite duration emission interval in response to a detection of said prescribed portion by said detection means.

* * * * *

UNITED STATES PATENT AND TRADEMARK OFFICE
CERTIFICATE OF CORRECTION

PATENT NO. : 5,557,483

DATED : September 17, 1996

INVENTOR(S) : KAZUHIRO TAKAHASHI

It is certified that error appears in the above-identified patent and that said Letters Patent is hereby corrected as shown below:

COLUMN 2

Line 56, "interval" should read --interval,--.

COLUMN 3

Line 11, "k" should be deleted; and
    Line 52, "least" should read --at least--.

Signed and Sealed this

Nineteenth Day of August, 1997

Attest:

BRUCE LEHMAN

Attesting Officer     Commissioner of Patents and Trademarks